United States Patent Office 2,895,813
Patented July 21, 1959

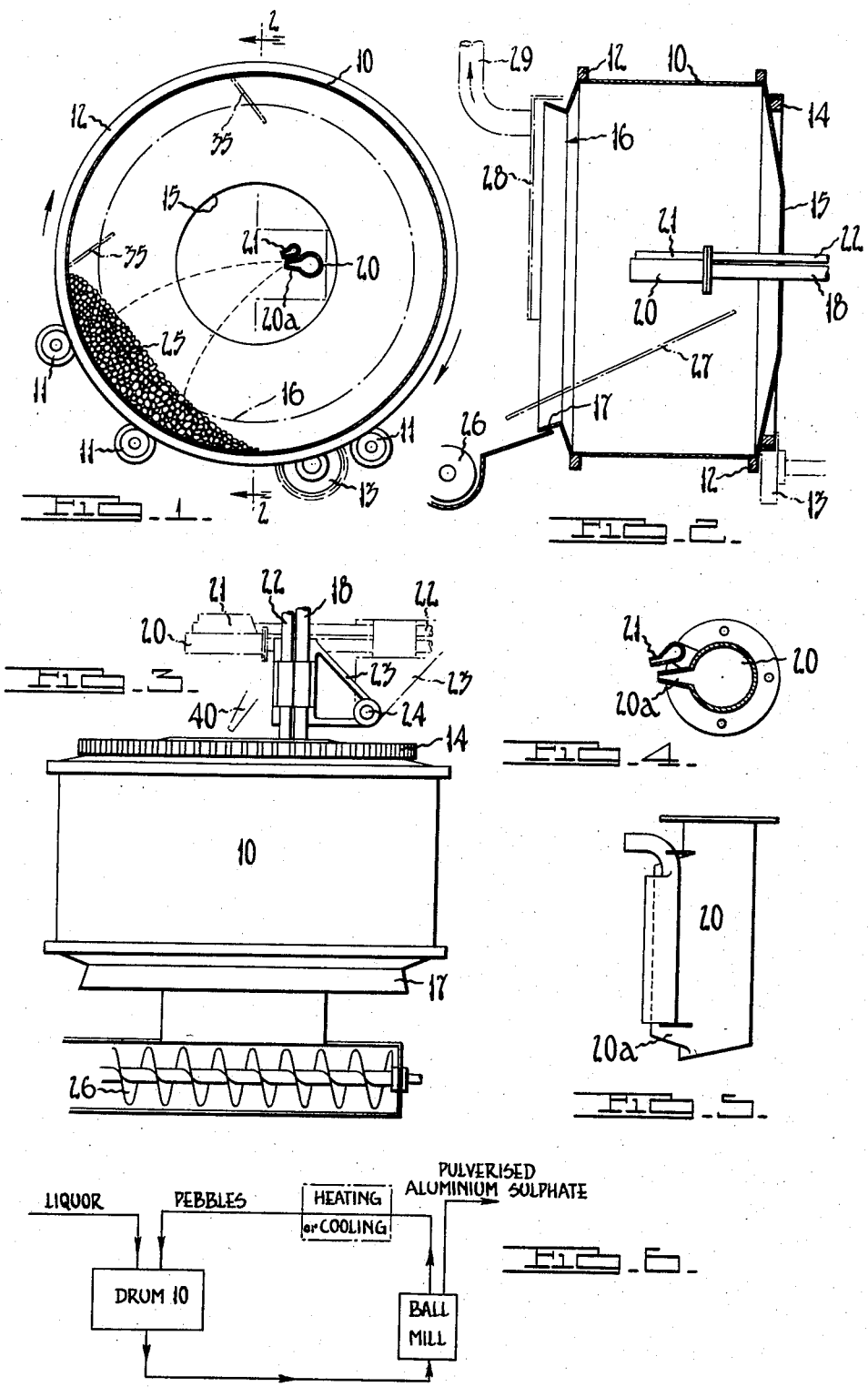

2,895,813
PROCESS OF PRODUCING SOLID ALUMINUM SULPHATE

Harry Percival Brooksbank, Mordialloc, Victoria, and Michael James Martin, Canterbury, Victoria, Australia, assignors to Sulphates Limited, Melbourne, Victoria, Australia, a corporation of Victoria, Australia Application September 29, 1955, Serial No. 537,494

Claims priority, application Australia October 5, 1954

3 Claims. (Cl. 23—301)

The common process for the production of commercial aluminium sulphate from aluminous ores such as bauxite, bauxitic clay and aluminous clay comprises drying and/or calcining the ore, reducing it to a fine state of subdivision by dry grinding and then digesting it with sulphuric acid in such a proportion that the $Al_2O_3$ plus $Fe_2O_3$ content of these ores is combined with the $SO_3$ of the acid to form the compounds $$Al_2(SO_4)_3 + xH_2O \text{ and } Fe_2(SO)_4 + xH_2O$$

the latter being an impurity which results from the presence of iron compounds in the ores.

After the digestion reaction is completed, the aluminium sulphate liquor is separated from the insoluble residue by filtration or sedimentation or a combination of both. The liquor thus recovered, and having a specific gravity of about 1.35, is evaporated in suitable evaporators to a specific gravity of approximately 1.6, and this material solidifies at a temperature of about 85–87° C. and is thus a melt. This molten material is then cast on to pouring trays or moulds where it solidifies, after which it is either sold in ingot form or is barred up from the pouring floor, spalled by manual labour and then fed to a crusher which reduces it to a size suitable for commercial use.

The removal of the solidified material from the pouring floors or moulds involves arduous manual labour particularly as this operation is usually performed shortly after the material has set, and while it is still relatively hot.

With the object of obviating the said manual work and to reduce production costs, attempts have been made to cool and solidify the hot sulphate of alumina liquor by spray drying within a chamber and by casting in continuous mould coolers, but such methods are subject to disadvantages and have not been widely adopted in the industry.

Now the object of the present invention is to provide improvements in the operations of cooling and solidifying the aforesaid evaporated antd concentrated product.

Accordingly, the invention includes the method of producing solid aluminium sulphate containing from about 14 to about 18% $Al_2O_3$, which consists essentially in the steps of maintaining a charge or mass of nodules of hydrated aluminum sulphate in a state of continuous agitation, directing molten aluminum sulphate in a subdivided condition onto the agitated nodules from a discharge position spaced therefrom, cooling the discharged molten material whereby it solidifies in contact with the agitated nodules so as to increase the size of some of the nodules of the mass and also to form nuclei of fresh nodules, and continuously removing nodules from said mass.

The molten material is preferably sprayed onto the said agitated mass or charge of nodules in the form of droplets of appreciable size rather than in a state of fine division such as would be produced by an atomising nozzle. Alternatively, the molten material may be discharged in the form of a thin film or curtain of controllable thickness in which case it is preferably broken up or dispersed, and directed onto the agitated mass by a more or less laterally directed blast of air which additionally serves to cool the material.

Preferably the operation is carried out in a drum of relatively large diameter and relatively short length arranged with its axis disposed substantially horizontally and rotated continuously at a relatively low speed whereby the mass of nodules contained therein are caused by friction to ascend at the rising side of the drum and then to slide downwardly so that they are in a condition of continual but variable movement and the spray is directed onto the thus agitated mass.

Furthermore the drum may be, and preferably is rotated at a speed which is sufficiently high to cause the nodules to cascade similarly to the balls in a ball mill instead of merely sliding therein.

The nodules are progressively discharged from the drum with or without previous screening to size.

As aluminium sulphate solidifies at a temperature of about 85°–87° C., the sprayed droplets will generally be in the semi-solid tacky or plastic condition of incipient solidification when they impinge on the moving mass of previously formed nodules within the rotating drum and it appears that these nodules tend to increase in size by the accretion of additional solidifying droplets while other droplets apparently coalesce or adhere together to form the nuclei of fresh nodules, which then increase in size in the same manner. This mode of size increase is indicated by the physical character of the nodules.

The production of aluminium sulphate in nodular form as above described provides substantial advantages, even if the nodules vary considerably in size, because the discharged material can be immediately and automatically conveyed to a desired location and subjected if desired, to crushing or other treatment without the delay and the manual labor which is involved when the material is cast in moulds in the usual way. Furthermore, the continuous production of the solid material in nodule form renders it advantageous to carry out continuously the preceding clarifying and concentrating operations so as to permit of further economies whereas these preceding operations cannot at present be usefully effected continuously for the reason that the final casting operation is an intermittent one.

At the commencement of operations, the drum contains a sufficient mass of preformed nodules produced during a previous operation, or of cast material which has been crushed to a suitable size.

The invention is further described with reference to the accompanying drawings which are diagrammatic in character and wherein:

Figure 1 is a view in sectional elevation of the preferred form of nodulising apparatus according to the invention.

Figure 2 is a view in sectional end elevation taken on the line 2—2 of Figure 1.

Figure 3 is a view in plan.

Figure 4 is a cross-sectional view to a larger scale of a nozzle unit.

Figure 5 is a view in plan of the nozzle unit, and

Figure 6 is a flow sheet.

The apparatus shown in Figures 1, 2 and 3 comprises a drum 10 of relatively large diameter and relatively short length having its axis disposed horizontally.

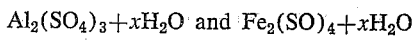

The drum is rotatively supported by flanged rollers 11 which engage external rings 12 thereon and a pinion 13 which meshes with a gear ring 14 on the drum serves to rotate the latter continuously at a relatively slow speed and in the direction indicated by the arrow in Figure 1.

One end of the drum, which may be termed the inlet end thereof, is formed with an axial opening 15 of substantial diameter while an axial opening 16 of larger diameter is formed in the opposite or discharge end of the drum, this opening being located at the inner end of an outwardly diverging throat formed by a flared apron 17 secured to the inner periphery of the drum end as shown in Figure 2.

A normally fixed air inlet pipe 18 extends horizontally into the opening 15 at the inlet end of the drum with an air discharge unit 20 having an elongated nozzle 20a projecting radially therefrom and towards the rising side of the drum.

A similarly elongated discharge nozzle 21 for the molten aluminum sulphate is arranged above and parallel to the air nozzle 20a and is connected to a supply pipe 22.

The pipes 18 and 22 are supported on a frame 23 which is pivoted to a fixed vertical post 24 whereby the nozzles 20a and 21 may be readily swung outwardly from the drum for any necessary attention as shown in broken lines in Figure 3.

In normal operation the liquid aluminum sulphate is continuously discharged into the drum from the nozzle 21 in the form of a wide and thin curtain or sheet which is almost immediately disrupted into droplets by the current of air which is continuously discharged through the nozzle 20a.

Thus the liquid in a subdivided state is continuously directed onto a mass 25 of nodules of solid aluminum sulphate contained within the lower portion of the drum as shown in Figure 1.

It is to be noted that the nozzle 21 is sufficiently elongated to distribute the liquid over the greater part of the length of the drum.

The liquid may alternatively be sprayed onto the mass 25 by any other suitable means and may for example be discharged obliquely into the drum from a nozzle arranged externally thereof as shown at 40 in Figure 3 and this nozzle may be oscillated to distribute the liquid over the mass.

Due to the rotation of the drum the mass 25 is frictionally displaced in the direction of rotation as indicated in Figure 1, whereby the nodules continuously cascade downwardly over the upper surface of the mass and the sprayed liquid is directed thereonto.

At the outset of each operation the drum preferably contains a sufficient mass of nodules produced during the preceding operation, though alternatively aluminum sulphate which has been cast in the usual way may be crushed to the requisite size to form the necessary starting mass.

As previously stated the initial fragments or nodules tend to enlarge by accretion as the freshly deposited liquid solidifies thereon, while in addition fresh nodules are continuously formed as the operation proceeds.

When the mass increases sufficiently the nodules continuously spill over through the opening 16 at the discharge end of the drum and are directed by the flared apron 17 into the trough of a screw conveyor 26 by which they are continuously conveyed to a desired location for bagging or for crushing or other treatment.

Thus in normal operation nodules are discharged at the same rate as fresh liquid is supplied to the drum.

The nodules produced as above described are variable in size, but if desired, greater uniformity may be obtained by means of an inclined sizing screen 27 shown in broken lines in Figure 2, which extends into the drum through the discharge opening 16 and which directs oversize nodules into the discharge conveyor. For this purpose it is necessary to lift the nodules within the drum and to drop them onto the inclined screen and for this purpose the drum may be provided on its inner periphery with lifting vanes two of which are indicated in broken lines at 35 in Figure 1. Thus undersized nodules which fall onto the screen pass through the openings therein and are subjected to further treatment, while oversize nodules are continuously discharged into the conveyor and it will be apparent that when this form of the invention is used, the sprayed liquid is preferably directed onto the nodules as they are falling onto the screen.

In an experimental plant which has produced satisfactory nodules, the majority of which varied from about ¼ to ¾ of an inch in size, the drum was approximately 8 feet in diameter and approximately 4 feet long and was rotated continuously at a speed of about 3¾ revolutions per minute.

The liquid aluminum sulphate was supplied to the drum at the rate of about 100 lbs. per minute and the nodules material was discharged at the same rate.

If desired, the bodies, constituting the mass 25 thereof within the drum, may consist partly of flints, pebbles or the like, such as are used in a flint or pebble mill, whereby some of the sprayed liquid will solidify on the surfaces thereof. In these circumstances the material discharged from the drum will consist partly of flints or pebbles which may or may not be coated with aluminum sulphate and partly of nodules or particles of the latter material. This mixture may then be delivered by the conveyor to a rotary ball mill as indicated in Figure 6 whereby the aluminium sulphate is pulverised therein. After removal from the mill, the pulverised material is suitably separated from the said flints, pebbles or the like and the latter are returned continuously to the inlet side of the drum and are thus recycled at a controlled speed which is coordinated with the rate of feed of molten liquid to the drum.

In this regard, the temperature of the molten material as fed to the discharge nozzle of the cooling and solidifying apparatus would normally be at or below the boiling point (approximately 114° C.) thereof and the water soluble alumina content of the product will vary between 14% $Al_2O_3$ to 18% $Al_2O_3$ according to the specific gravity to which the liquor has been evaporated. It has been found impracticable to evaporate sulphate of alumina liquors in the conventional evaporators of the open pan and coil type to give a concentration in the finished product above about 18% $Al_2O_3$. According to the present invention, however, the concentration of alumina can be accelerated or further increased to a small extent by superheating the feed liquor in a suitable pressure vessel or jacketed heat exchanger so that some flash evaporation occurs from the droplets of the liquor when they are discharged from the spray nozzle or other discharge means. However, the aluminum content cannot be increased much above 18% $Al_2O_3$ and so would be substantially lower than 22.7%. Consequently, nodules produced according to the present invention are not suitable for dehydration by heating.

In order to assist in cooling the material and to avoid condensation of vapour within the drum, it has been found desirable to supply sufficient cool air to the interior thereof and this may be effected, as shown in Figure 2, by partly closing the discharge end of the drum by a cover 28 having a suction pipe 29 connected thereto so as to induce axial flow of cooling air through the drum. Preferably however, sufficient air to provide the required cooling effect is discharged through the nozzle 20a.

We claim:

1. Process of producing nodules of solid hydrated aluminum sulphate from a liquid hydrated aluminum sulphate having a specific gravity of approximately 1.6, which consists essentially in the steps of maintaining a charge of solid nodules of solid hydrated aluminum sulphate containing from 14 to about 18% $Al_2O_3$ in a state of continuous agitation, establishing and maintaining a supply of said liquid hydrated aluminum sulphate at a temperature substantially about 85–87° C., continuously directing said liquid hydrated aluminum sulphate in subdivided condition onto the agitated nodules from a discharge position spaced therefrom while cooling the discharged liquid hydrated aluminum sulphate whereby the latter solidifies in contact with the agitated nodules and the latter enlarge by accretion to nodules of solid hydrated aluminum sulphate containing from 14 to about 18% $Al_2O_3$ while at the same time fresh nodules of solid hydrated aluminum sulphate containing from 14 to about 18% $Al_2O_3$ are formed, and continuously removing nodules from said agitated charge at substantially the same rate said liquid hydrated aluminum sulphate is supplied.

2. Process defined in claim 1, in which said nodules are agitated by causing them to undergo continuous sliding and cascading movements, and in which said liquid aluminum sulphate in subdivided condition is directed onto the exposed surfaces of the moving nodules.

3. Process defined in claim 1, in which said liquid aluminum sulphate is delivered to the vicinity of the agitated nodules in the form of a relatively wide and thin sheet and in which the sheet is disrupted into droplets by directing substantially unheated air under pressure laterally thereagainst said air serving also to cool said liquid aluminum sulphate droplets.

References Cited in the file of this patent

UNITED STATES PATENTS

| | | |
|---|---|---|
| 1,245,328 | Freeman | Nov. 6, 1917 |
| 2,340,567 | Sargent | Feb. 1, 1944 |
| 2,436,766 | Davis | Feb. 24, 1948 |
| 2,436,771 | Hood | Feb. 24, 1948 |

FOREIGN PATENTS

| | | |
|---|---|---|
| 514,149 | Great Britain | Oct. 31, 1939 |
| 576,557 | Great Britain | Apr. 10, 1946 |